United States Patent
Atkinson

[15] 3,656,242
[45] Apr. 18, 1972

[54] ELECTRONIC CIRCUITS INSTRUCTIONAL APPARATUS

[72] Inventor: Robert J. Atkinson, Philadelphia, Pa.
[73] Assignee: Burroughs Corporation, Detroit, Mich.
[22] Filed: Mar. 16, 1970
[21] Appl. No.: 19,826

[52] U.S. Cl. ............................................. 35/19 A, 35/9 R
[51] Int. Cl. ................................. G09b 23/18, G09b 7/06
[58] Field of Search ..................... 35/19, 19.1, 9 R, 9 A, 9 B

[56] References Cited

UNITED STATES PATENTS

| | | | |
|---|---|---|---|
| 3,292,276 | 12/1966 | Hansel | 35/9 R |
| 3,340,620 | 9/1967 | Meade | 35/19 A |
| 3,466,758 | 9/1969 | Miller | 35/9 R X |
| 2,470,434 | 5/1949 | Eckman et al. | 35/19 A X |

FOREIGN PATENTS OR APPLICATIONS 61,137  4/1968  East Germany..........................35/9 R

*Primary Examiner*—Harland S. Skogquist
*Attorney*—Paul W. Fish and Charles S. Hall

[57] ABSTRACT

A teaching apparatus which permits construction and testing of a number of different electronic circuits with a single set of electronic components, such as resistors, capacitors, transistors, etc. Problems can be inserted into the apparatus, in which case the correctness of answers to the problems is indicated and the number of incorrect answers is recorded.

10 Claims, 6 Drawing Figures

PATENTED APR 18 1972

INVENTOR.
ROBERT J. ATKINSON

BY

*Samuel Kane*

ATTORNEY

INVENTOR.
ROBERT J. ATKINSON
BY
Samuel Kane
ATTORNEY

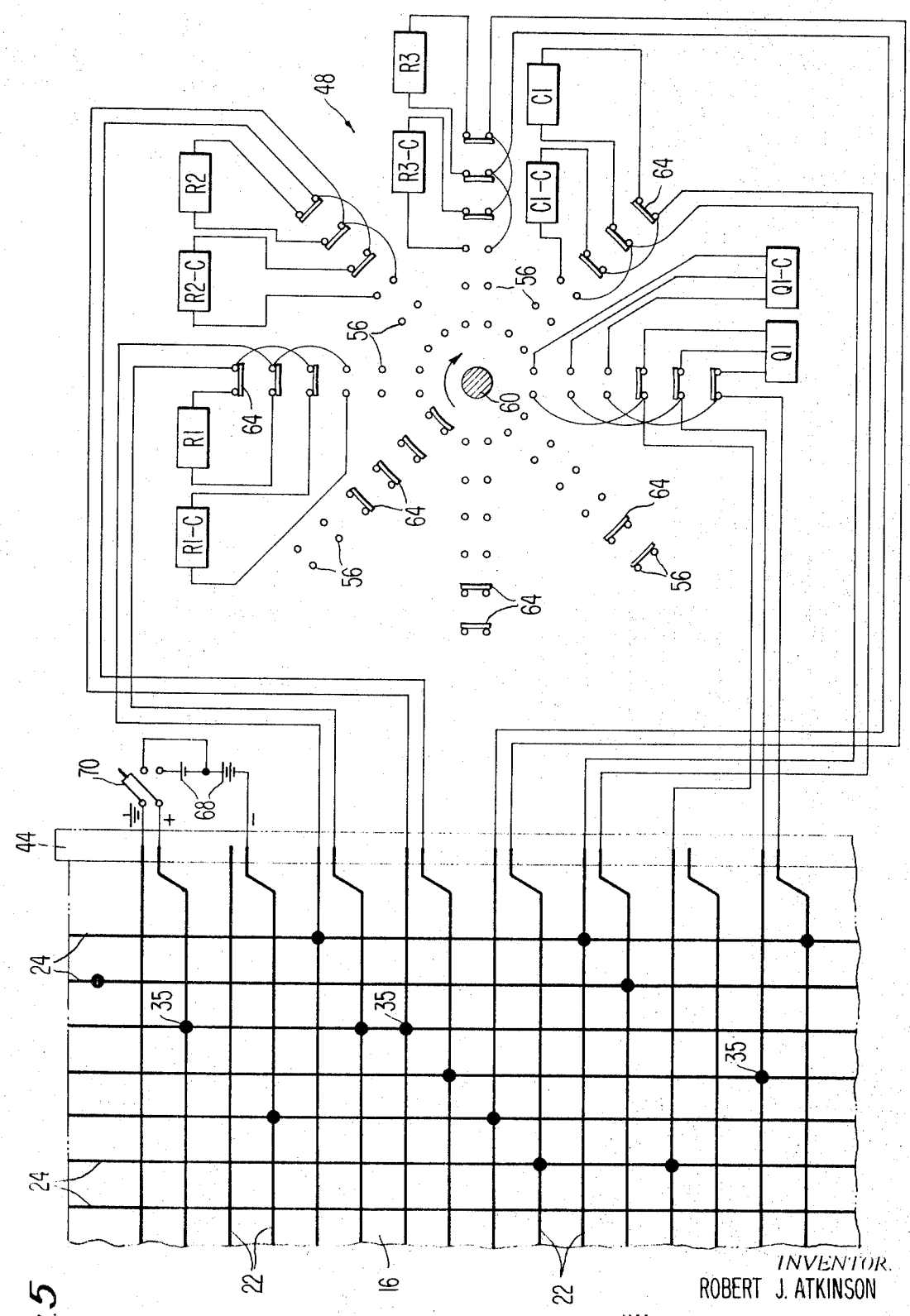

ELECTRONIC CIRCUITS INSTRUCTIONAL APPARATUS

BACKGROUND OF THE INVENTION

This invention relates generally to teaching aids and particularly to apparatus to be used by instructors and students of electronic circuits.

In the study of electronics, students have been provided with training devices to assist them in learning basic electronic troubleshooting techniques. In most cases, each one of the training devices was constructed for a particular circuit. This meant that if there were 20 different circuits, for example, 20 different circuit boards, each complete with its own set of electronic components, was required. This was so even though all of the circuits were composed of the same type of electronic components.

SUMMARY OF THE INVENTION

An object of the invention is to provide improvements in teaching apparatus.

Another object of the invention is to provide an educational aid for instructors and students of electronic circuits.

A further, more specific object of the invention is to provide an instructional apparatus which uses a single set of electronic components for constructing and testing a number of different electronic circuits.

A further object of the invention is to provide an instructional apparatus in which troubleshooting problems can readily be inserted.

Still a further object of the invention is to provide an instructional apparatus with means for indicating the correctness of answers to problems inserted into the apparatus.

Another object of the invention is to provide such an apparatus which can record the number of times that answers to a problem are incorrect.

Still a further object of the invention is to provide an instructional apparatus which is simple to use and inexpensive to manufacture.

In accordance with the above objects and considered first in one of its broader aspects, an electronic circuits instructional apparatus according to the invention may comprise a plurality of electronic components and a plurality of plug-in circuit boards. Each circuit board comprises a group of spaced parallel conductors on both sides and with each conductor on each side of the board crossing over conductors on the other side of the board and establishing cross-over points. Certain of the conductors have terminal portions at at least one margin of the board. Connecting means passes through each circuit board at certain of the cross-over points and at other places for electrically connecting conductors on one side of the board to conductors on the other side of the board for partially constructing an electronic circuit which is different from each of the partial electronic circuits of the other boards. A receptacle apparatus is provided having a plurality of electrical contacts and which can receive therein at least one margin of any selected one of the boards so that the conductor terminal portions of the selected board are in contact with the electrical contacts. A power supply is provided, as well as means for electrically connecting the electronic components and the power supply to certain of the electrical contacts so as to complete the construction of an individual electronic circuit with each one of the circuit boards whenever it is inserted or plugged into the receptacle apparatus.

The invention will be more clearly understood when the following detailed description of the preferred embodiment thereof is read in conjunction with the accompanying drawing which is described below.

BRIEF DESCRIPTION OF THE DRAWING

FIG. 5 is a schematic diagram showing certain elements of a Problem switch in a normal position, and the means for connecting the electronic components to conductors of the preprogrammed circuit board;

DESCRIPTION OF THE PREFERRED EMBODIMENT

Figure 1:
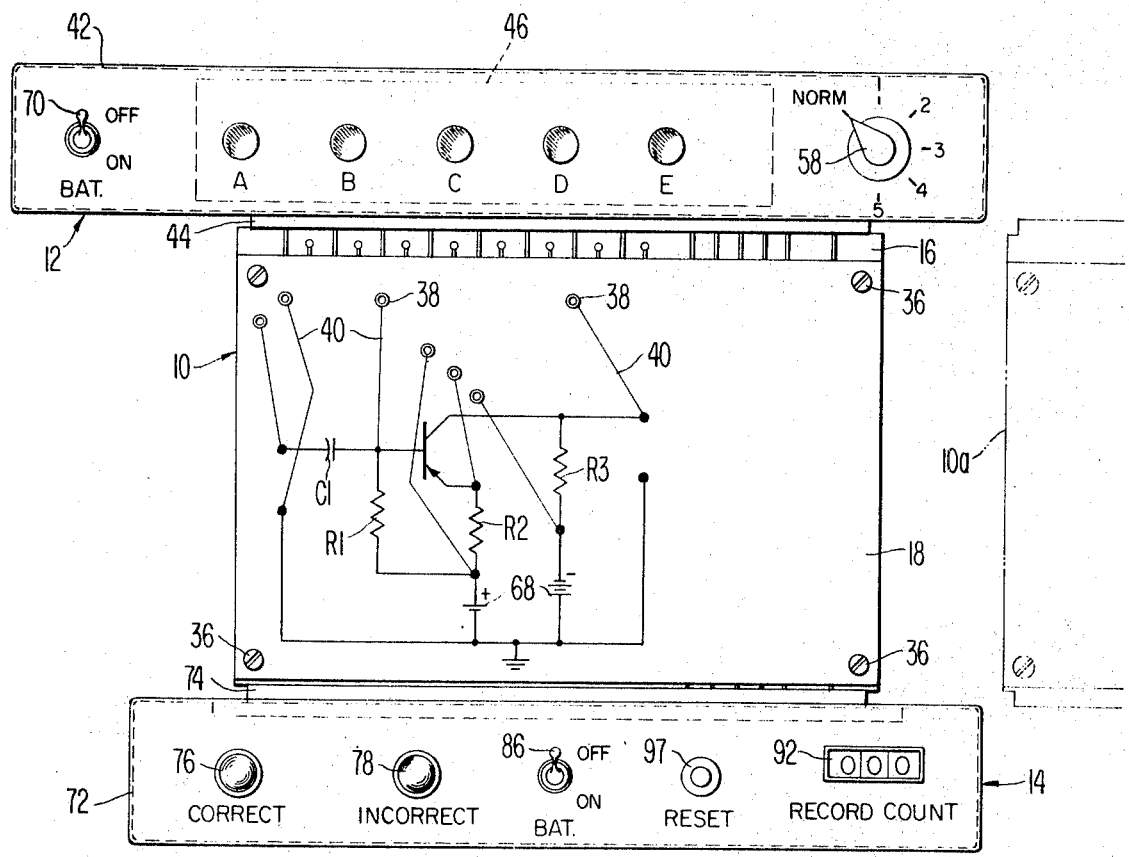
FIG. 1 is a plan view of an instructional apparatus constructed in accordance with the invention.

Referring to the drawing, the invention comprises one or more preprogrammed circuit board assemblies 10, FIG. 1 and associated electrical circuitry contained in a receptacle apparatus 12 and 14. Additional preprogrammed circuit board assemblies are represented diagrammatically by a dotted block 10a. Each of the circuit board assemblies 10 or 10a is programmed according to an electronic circuit which is different from each of the electronic circuits of the other assemblies.

The circuit board assembly 10 shown in the drawing comprises a preprogrammed circuit board 16 and an overlay 18. The circuit board 16 comprises a panel 20, FIG. 4 of electrical insulating material and a plurality of parallel conductors 22 on one side of the panel 20 and a plurality of parallel conductors 24 and 26 on the other side of the panel 20. The conductors 26 are interconnected with another conductor 28 which is also preferably parallel to the conductors 22. Certain of the conductors 22 and 28 are provided with terminal portions 30 which make contact with electrical contacts in multiple contact connector receptacles in the receptacle apparatus 12 and 14, as will be described.

Connections are made between the conductors on one side of the board 16 and conductors on the opposite side of the board 16 by drilling or otherwise forming holes 34 at the intersections or cross-over points of the conductors and at other points, as desired, and by filling or plating the holes 34 with conductive material 35 in a manner well-known in the printed circuit art, so that the conductive material 35 connects to the conductors, or in any other manner, as by using conductive eyelets. Certain of the conductors 22 have terminal portions 30 on the opposite side of the board 16 and these conductors 22 are connected to such terminal portions 30 by means of short conductive connecting strips 32 and conductive portions 35.

Figure 2:
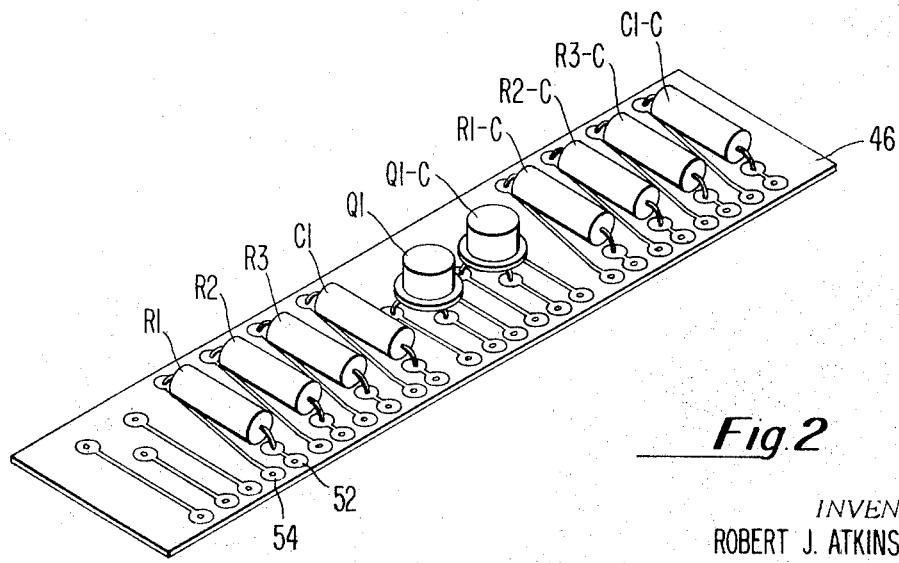
FIG. 2 is an isometric view of a printed circuit board and electronic components contained in the interior of the apparatus of FIG. 1.
Figure 3:
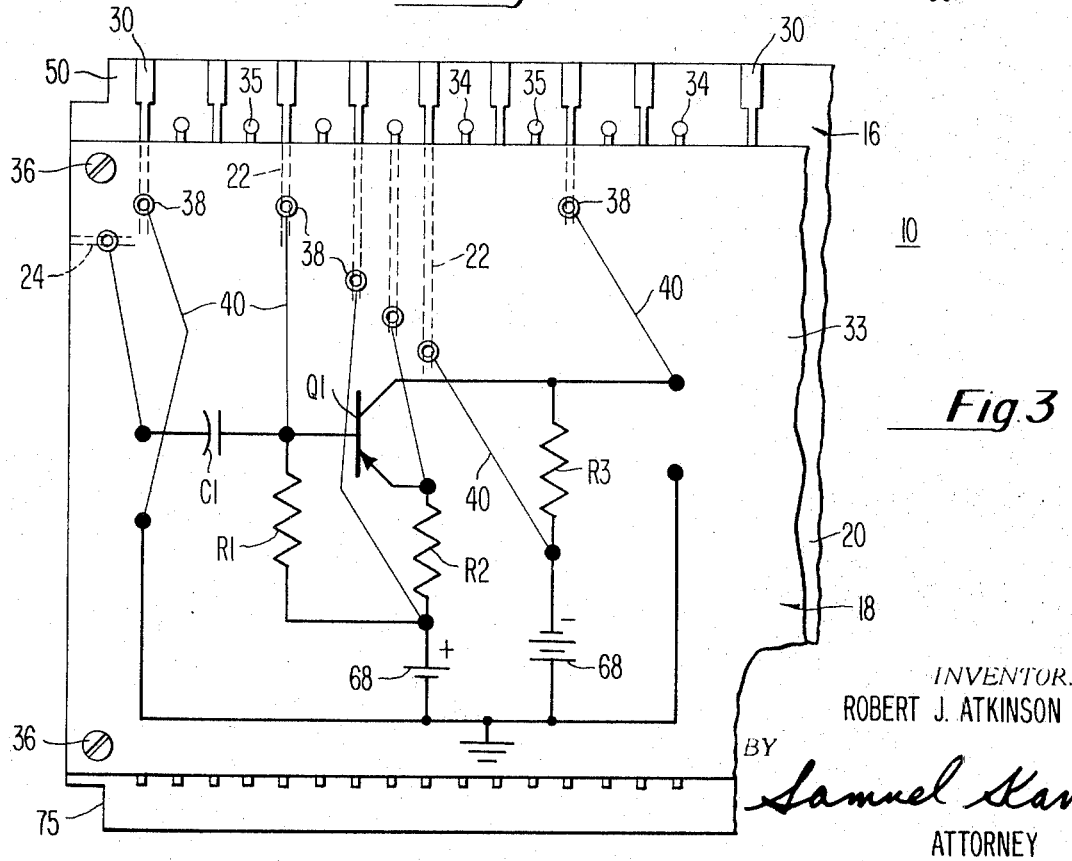
FIG. 3 is an enlarged fragmentary view of a preprogrammed circuit board and associated overlay of the apparatus of FIG. 1.

The overlay 18, FIG. 3 comprises a sheet of material 33 which is positioned on and preferably secured to the circuit board 16, as by means of screws 36. The overlay 18 contains a schematic diagram of the physical circuit contained in the apparatus of FIG. 1, and is provided further with openings which may be in the form of eyelets 38 through which a test prod can be inserted by the operator when testing the circuitry. Preferably, the central openings in the eyelets 38 are in line with conductive material 35 at the cross-over points of the appropriate conductors, or at other points, however, the eyelets 38 can be positioned at other places in the overlay 18, so long as they provide access to the same conductor. The overlay 18 is also provided with lines 40 which reference the eyelets 38 to the corresponding test points on the schematic diagram. For the sake of simplicity, the electronic components on the schematic diagram and in FIG. 5 have been given the same reference characters as their physical counterparts shown in FIG. 2.

The receptacle apparatus 12, FIG. 1 contains a circuit and answer control unit which comprises a housing 42 in which is suitably secured a multiple contact connector 44 and a supporting and connecting means, such as a printed circuit board 46, FIG. 2, for the normal or normal-value electronic components such as resistors R1, R2 and R3, capacitor C1, and transistor Q1, and what may be termed the "changed-value" components which include resistors R1-C, R2-C and R3-C, capacitor C1-C and transistor Q1-C. The electronic components on the circuit board 46 are electrically connected to appropriate conductors on the programmed circuit board 16 by means of a Problem switch structure 48, FIGS. 5 and 6, and the multiple contact connector 44, FIG. 1, into which the margin 50, FIG. 4, of the programmed circuit board 16 is inserted or plugged. Thus, for example, resistor R1, FIG. 2, has its leads electrically connected to printed circuit pads 52 and 54 on the circuit board 46 and these pads 52 and 54 are electrically connected to two of a plurality of fixed contacts 56, FIG. 5, of the Problem switch 48. The Problem switch structure 48 comprises a manually operable knob 58, FIG. 1, secured on a rotatable shaft 60, FIGS. 5 and 6, two banks of fixed contacts 56, FIG. 5, and 62, FIG. 6, and two banks of movable conductive connecting bars 64, FIG. 5, and 66, FIG. 6. The connecting bars 64 and 66 move as a unit together with the knob 58 and shaft 60. A suitable power supply 68, FIG. 5, is also contained in the housing 42 and has its terminal portions connected to electrical contacts of the multiple contact connector 44 which in turn are in electrical contact with the appropriate conductors 22 on the programmed circuit board 16 through their terminal portions 30. The power supply 68 also includes a switch 70 for turning the power supply 68 on and off. Also contained in the housing 42 are push-button answer selecting switches A, B, C, D and E, see also FIG. 6.

Figure 4:
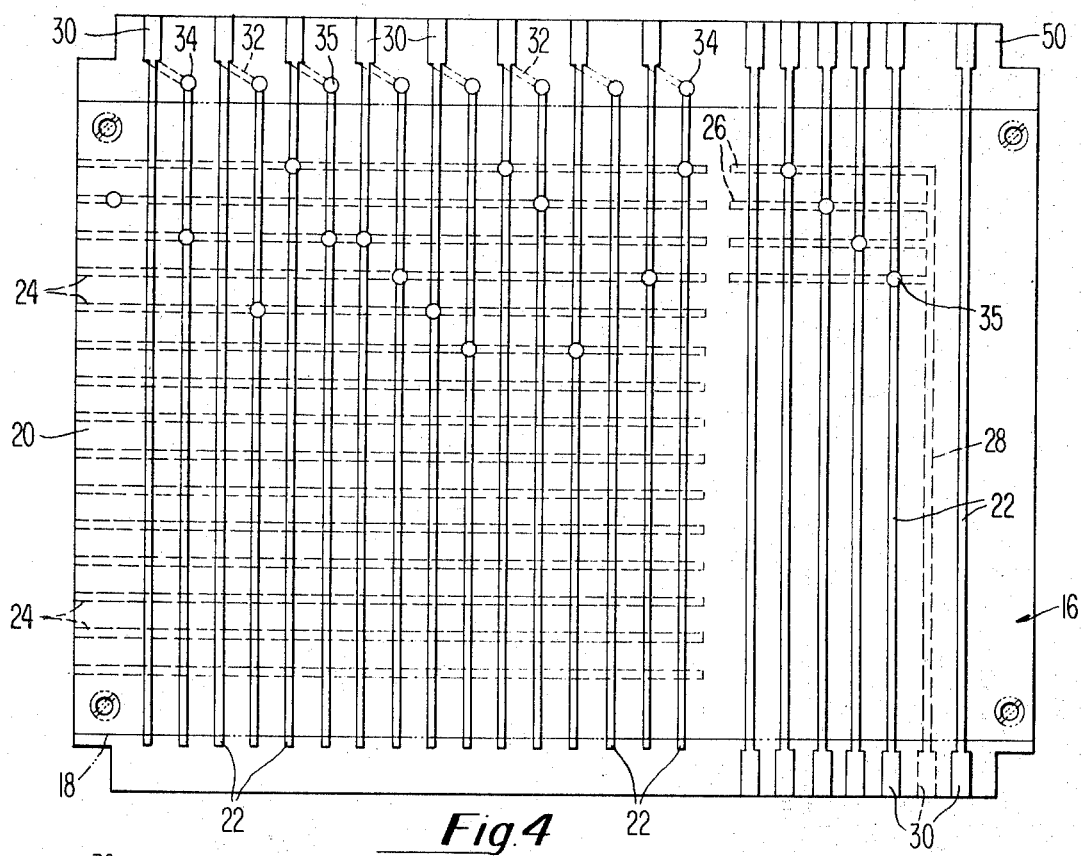
FIG. 4 is a full view of the preprogrammed circuit board of FIG. 3 but with the overlay member omitted.

The receptacle apparatus 14, FIG. 1, contains a circuit and answer indicator unit which includes a housing 72 in which are supported a multiple contact connector receptacle 74 in which is inserted or plugged the margin 75, FIG. 4, of the programmed circuit board 16, and the circuit elements of the answer circuitry. The answer circuitry includes a Correct indicating lamp 76, FIGS. 1 and 6, and an Incorrect indicating lamp 78 having one of their terminals interconnected and connected to the junction of two resistors 80 and 82 across which a power supply 84 may be connected by closing a switch 86. The other terminal of the lamp 76 is connected to the cathode of a diode 88 and the other terminal of the lamp 78 is connected to the anode of a diode 90. An incorrect-answer recording device in the form of a pulse counter 92 has its input circuit 94 connected to the junction of the terminal of the lamp 78 and the anode of the diode 90. If desired, the pulse counter 92 may be provided with a reset 97, FIG. 1, for restoring the counter 92 to a starting condition after each use.

Figure 6:
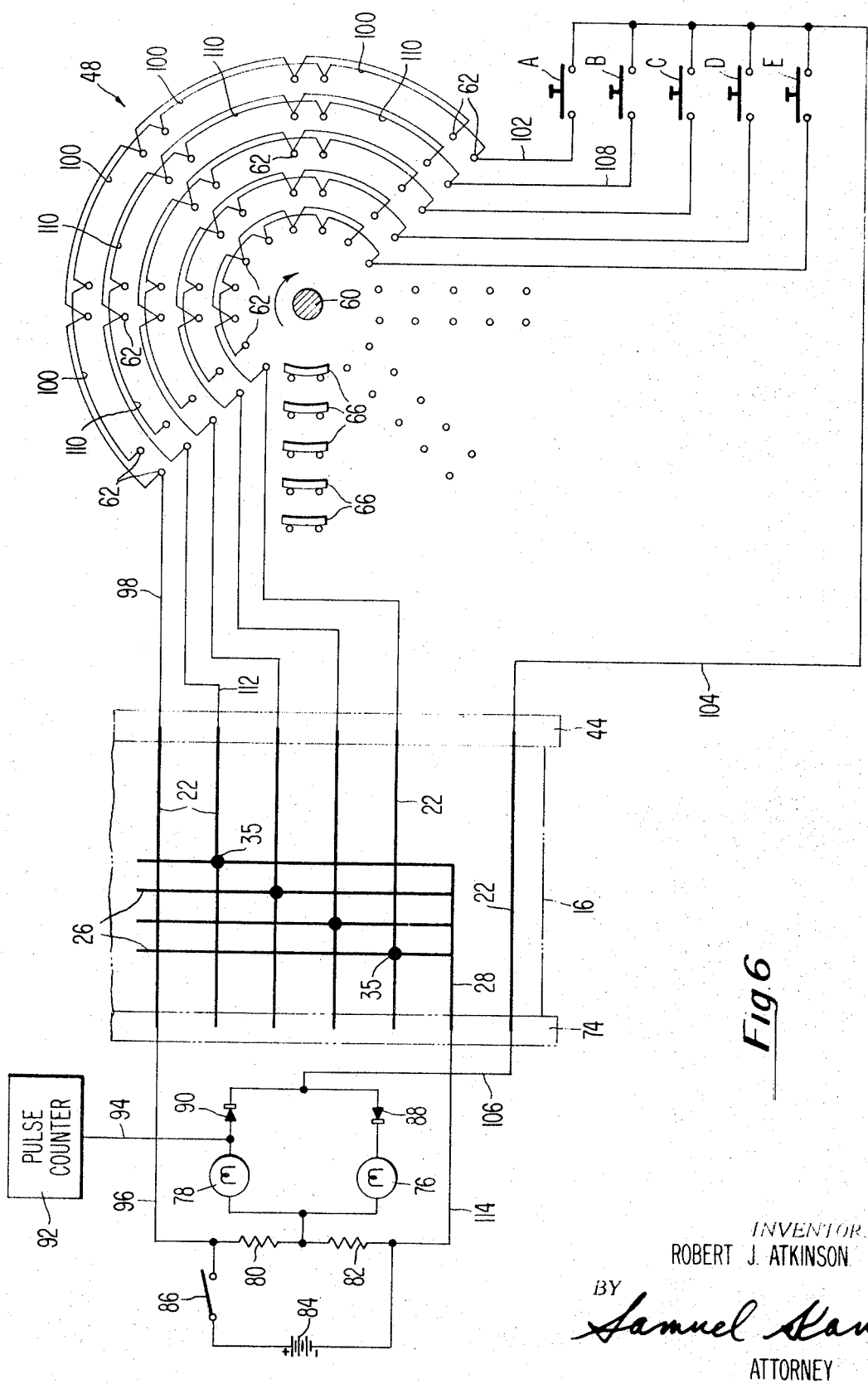
FIG. 6 is a schematic diagram showing other elements of the Problem switch in the normal position, and the means for connecting answer selecting switches to the answer indicating lamps.

By selectively connecting the conductors 26, FIG. 6, to their associated conductors 22 at the cross-over points, any one of the answer selecting switches A–E can be programmed to represent a correct answer and the remaining ones of the switches A–E will then each represent an incorrect answer. As illustrated in FIG. 6, the conductors 26 and 22 have been selectively connected at cross-over points by material 35 so that push-button switch A represents a correct answer and each of the push-button switches B–E represents an incorrect answer.

Problems are inserted into the apparatus by manually rotating the switch knob 58 to any one of five positions indicated in FIG. 1, depending upon the particular problem it is desired to insert. Each of the five switch positions represents one of the changed-value resistors R1-C, R2-C and R3-C, the changed-value capacitor C1-C and the changed-value transistor Q1-C. By rotating the switch knob 58 to one of the five positions, the changed-value electronic component is connected into the circuitry and the corresponding normal-value component is disconnected from the circuitry.

It will be recalled that all the connecting bars 64 and 66 move as a unit with the shaft 60 and knob 58 so that if the knob 58 were rotated clockwise to the first switch position, for example, the connecting bars 64, FIG. 5, in contact with the contacts 56 connected to the leads of the electronic component R1 will move to the next switch position to electronic component R2 and the connecting bars 64 in the previous position will move into contact with the terminals 56 which are connected to the electronic component R1-C. In this manner, the changed-value component R1-C will replace the normal component R1 in the circuit so that when the circuit is tested, the test will appear to indicate that R1 is defective. By choosing the appropriate kinds of changed-value components, or by omitting a changed-value component, the defect can be made to appear as an open circuit, a short circuit or a component whose value has changed.

The operator may test the circuit by applying suitable test probes into the openings of the eyelets 38 so that they come into contact with the conductive material on the circuit board 16 below the opening of the eyelet. When the operator has tested and analyzed the circuit, he will then indicate his answer to the problem by depressing one of the answer selecting push-button switches A–E. The meaning of the switches will have been previously furnished to the operator, usually in the form of a written instruction which will inform him that each one of the push-button switches A–E represents a defective one of the electronic components R1, R2, R3, C1 and Q1. Thus, for example, the instruction might indicate that push-button switch A represents a defective resistor R1, that push-button switch B represents a defective resistor R2, that push-button switch C represents a defective resistor R3, that push-button switch D represents a defective capacitor C1, and that push-button switch E represents a defective transistor Q1.

If the operator selects the correct answer by pushing the correct one of the push-buttons A–E, the Correct indicating lamp 76 will light and if he pushes one of the incorrect push-buttons the Incorrect indicating lamp 78 will light and an incorrect-answer count will be registered against him in the pulse counter 92.

In accordance with the illustrative manner in which the conductors 26 have been connected to the conductors 22, depression of the push-button switch A will always indicate a correct answer and depression of any one of the push-button switches B–E will indicate an incorrect answer, and this will be so in any one of the five positions to which the switch knob 58 may be rotated from the normal position of the switch indicated in FIGS. 1, 5 and 6. Thus, if the switch knob 58 is rotated to the first position, for example, and push-button switch A is depressed, it will close a circuit including the power supply 84, the switch 86, a conductor 96, the multiple contact connector receptacle 74, a conductor 22 on the circuit board 16, the multiple contact connector receptacle 44, a conductor 98, a connector bar 66, a series of conductors 100, a conductor 102, the switch A, a conductor 104, the multiple contact connector receptacles 44 and 74 and a conductor 22 on the board 16, a conductor 106, the diode 88, lamp 76 and resistor 82. If, for example, the wrong-answer push-button switch B is depressed, it will close a circuit including the power supply 84, switch 86, resistor 80, the Incorrect indicating lamp 78, the diode 90, the conductor 106, the multiple contact connector receptacles 74 and 44 and the conductor 22 on the board 16, the conductor 104, the switch B, a conductor 108, a series of conductors 110, a connecting bar 66, a conductor 112 connected to a contact 62 which is in contact with this connecting bar 66, the multiple contact connector 44, conductors 22, 26 and 28 on the circuit board 16, the multiple contact connector receptacle 74, and a conductor 114. The initial surge of current through the lamp 78 will cause a signal to be applied to the pulse counter 92 through its input circuit 94 so as to cause the counter 92 to be incremented by one count.

In order to change over to a different one of the additional preprogrammed circuit board assemblies 10a, the apparatus is first dismantled by simply pulling the receptacle apparatus 12 and 14 off the margins of the circuit board 16 of the circuit board assembly 10, and then inserting or plugging in another one of the circuit board assemblies 10a into the receptacle apparatus 12 and 14. If the answer selecting switches A–E are programmed differently in the new circuit board assembly 10a, another instruction sheet is provided to the operator to inform him of the new meaning of the answer selecting switches A–E.

What is claimed is:

1. An instructional apparatus comprising a group of first electronic components each having multiple terminals, a group of second electronic components each having the same number of terminals as, and a value which represents a changed value of, an associated one of said first electronic components, means for interconnecting said first electronic components to form an electronic circuit, switching means operable for selectively disconnecting one of said first electronic components from said circuit and connecting its associated one of said second electronic components in its place so that all of its terminals are connected to the same points in said circuit to simulate that said disconnected component is defective, a plurality of answer selecting devices each associated with one of said first electronic components and operable by an operator to indicate his answer, after testing the circuit electrically at identified test points, that the associated electronic component is the defective one, indicating means actuated by operation of any one of said answer selecting devices for indicating the correctness of the operator's answer, and a circuit coupling said indicating means and said answer selecting devices and conditioned by operation of said switching means so that operation of one of said answer selecting devices results in a correct indication by said indicating means and operation of any of the other answer selecting devices results in an incorrect indication by said indicating means.

2. An instructional apparatus according to claim 1 including means actuated by operation of said any of the other answer selecting devices for recording the number of incorrect answers.

3. An instructional apparatus comprising a group of first electronic components each having multiple terminals, a group of second electronic components each having the same number of terminals as, and a value which represents a changed value of, an associated one of said first electronic components, a circuit board having a plurality of spaced parallel conductors on both sides, each conductor on each side of said board crossing over conductors on the other side of said board and establishing cross-over points, certain of said conductors having terminal portions at at least one margin of said board, connecting means at certain of said cross-over points for electrically connecting conductors on one side of the board to conductors on the other side of the board for partially constructing an electronic circuit, receptacle apparatus having a plurality of electrical contacts and receiving therein at least one margin of said board so that said terminal portions are in contact with said electrical contacts, a power supply, means for electrically connecting said first electronic components and said power supply to certain of said electrical contacts to complete the construction of said electronic circuit, means for electrically connecting said second electronic components to others of said electrical contacts but electrically disconnected from said electronic circuit, switching means operable for selectively disconnecting one of said first electronic components from said circuit and connecting in its place its associated one of said second electronic components so that all of its terminals are connected to the same points in said circuit to simulate that said disconnected component is defective, a plurality of answer selecting devices each associated with one of said first electronic components and operable by an operator to indicate his answer, after testing the circuit electrically at identified test points, that the associated electronic component is the defective one, indicating means actuated by operation of any one of said answer selecting devices for indicating the correctness of the operator's answer, and a coupling circuit coupling said indicating means and said answer selecting devices and conditioned by operation of said switching means so that operation of one of said answer selecting devices results in a correct indication by said indicating means and operation of any of the other answer selecting devices results in an incorrect indication by said indicating means.

4. An instructional apparatus according to claim 3 including recording means actuated by operation of said any of the other answer selecting devices for recording the number of incorrect answers.

5. An instructional apparatus according to claim 4 including an overlay secured to said circuit board having a schematic diagram thereon of said electronic circuit and provided with openings each for inserting a test prod of an electrical measuring instrument into contact with a conductive element connected to a conductor on said circuit board, said overlay also having means for referencing each opening to the corresponding test point on said schematic diagram.

6. An instructional apparatus according to claim 4 wherein there is further provided one or more additional circuit boards each similarly receivable into said receptacle apparatus and substantially identical to said first-mentioned circuit board except that at least one of its conductors is connected to another conductor at a different cross-over point so as to construct a different electronic circuit with said first group of electronic components.

7. An instructional apparatus according to claim 6 including an individual overlay secured to each additional circuit board, each overly having a schematic diagram thereon of the particular electronic circuit and provided with openings each for inserting a test prod of an electrical measuring instrument into contact with a conductive element connected to a conductor on the associated circuit board, each overlay also having line marks for referencing its openings to the corresponding test points on its schematic diagram.

8. An instructional apparatus according to claim 4 wherein said indicating means comprises a Correct indicating lamp and an Incorrect indicating lamp having a first one of their terminals interconnected, said answer selecting devices are individual switches each having a first one of its terminals coupled to a second terminal of each of said lamps, and certain of said conductors are selectively interconnected at cross-over points so that operation of said switching means will connect another terminal of a preselected one of said switches to the junction of said first lamp terminals through a first impedance element of said coupling circuit and will connect another terminal of the other of said switches to said junction through a second impedance element of said coupling circuit.

9. An instructional apparatus according to claim 8 wherein the first terminals of said switches are interconnected at a second junction which is coupled to each second terminal of said lamps through an individual asymmetrical current conducting device of said coupling circuit.

10. An instructional apparatus according to claim 9 wherein said recording means is a counter having an input terminal connected to the junction of said second terminal of said Incorrect indicating lamp and the asymmetrical current conducting device connected to it.

* * * * *